United States Patent [19]

Wu

[11] 3,875,218

[45] Apr. 1, 1975

[54] AROMATIC CARBOXYLIC ACID DISPROPORTIONATION

[75] Inventor: Yu-Lin Wu, Bartlesville, Okla.

[73] Assignee: Phillips Petroleum Company, Bartlesville, Okla.

[22] Filed: Apr. 27, 1973

[21] Appl. No.: 355,003

Related U.S. Application Data

[62] Division of Ser. No. 156,981, June 25, 1971, Pat. No. 3,776,930.

[52] U.S. Cl. ............................................. 260/515 P
[51] Int. Cl. ...................... C07c 63/00, C07c 63/26
[58] Field of Search .............................. 260/515 P

[56] References Cited
UNITED STATES PATENTS

| 2,848,487 | 8/1958 | Keen | 260/515 |
| 2,905,709 | 9/1959 | Schenk et al. | 260/515 |
| 2,938,050 | 5/1960 | Schirp et al. | 260/515 |
| 3,093,683 | 6/1963 | Raecke et al. | 260/515 |
| 3,096,366 | 7/1963 | Smith et al. | 260/515 |
| 3,101,368 | 8/1963 | Schenk | 260/515 |
| 3,261,863 | 7/1966 | Schenk et al. | 260/515 |
| 3,285,955 | 11/1966 | Schenk et al. | 260/515 |

Primary Examiner—James A. Patten

[57] ABSTRACT

A solid metal oxide dispersed in an inert dispersant is contacted with an aromatic carboxylic acid under reaction conditions for a time sufficient to form the corresponding metal salt of the aromatic carboxylic acid. The formed metal salt is also in the solid state and is also dispersed in the inert dispersant.

The metal salt, in the dispersant, is useful as a catalyst in the disproportionation of salts of aromatic carboxylic acids.

5 Claims, No Drawings

AROMATIC CARBOXYLIC ACID DISPROPORTIONATION

This application is a divisional of copending application Ser. No. 156,981 filed June 25, 1971, now U.S. Pat. No. 3,776,930, issued Dec. 4, 1973.

This invention relates to the production of aromatic polycarboxylates by disproportionation of alkali metal salts of aromatic carboxylic acids. This invention further relates to the recovery and reuse of the catalyst used in the production of aromatic polycarboxylates by disproportionation of alkali metal salts of aromatic carboxylic acids.

BACKGROUND OF THE INVENTION

It is well known in the art that alkali metal salts of carboxylic acids having carboxyl groups which are attached to aromatic ring systems can be converted, i.e., transformed, into salts of different carboxylic acids having at least two carboxyl groups in the molecule by heating the said alkali metal salts to elevated temperatures in the presence of a suitable catalyst and a protective gas. In this regard see U.S. Pat. No. 2,823,230 which describes, for example, the production of dipotassium terephthalate by conversion of potassium benzoate, using zinc benzoate to catalyze the reaction. It is also known that this transformation is a solid state reaction, that is, the alkali metal salt and the catalyst are heated in the solid state to effect the transformation, called disproportionation, with the resulting product also being in the solid state. This solid state reaction has caused considerable difficulties in the art with respect to its being used in commercial operations. Among these difficulties is included the problem of transporting, recovering, regenerating, and reusing the disproportionation catalyst which, during the disproportionation reaction, is converted to metal carbonates and oxides. In addition, during the solid state reaction the solids, including the spent catalyst, fuse together to form large solids, herein referred to as "clinkers," which are extremely difficult, if not impossible, to handle. The clinkers foul the reactor, causing process interruptions, and present problems in separation and recovery of the product.

It is also known in the art from, for example, U.S. Pat. No. 2,930,813, to recover the spent catalyst by dissolving the disproportionation product in a hot aqueous solution, such as a hot aqueous-methanolic benzoic acid solution. The dissolved spent catalyst is then reacted with an appropriate compound which regenerates the catalyst. This procedure causes the introduction of a new chemical into the system, that is, the solvent for the spent catalyst, and in addition requires numerous changes in state of not only the catalyst but also the other ingredients of the reaction product.

The Invention

It is thus an object of this invention to provide an improved process for the disproportionation of carboxylic acid salts.

Another object of this invention is to provide a process wherein the disproportionation of carboxylic acid salts is conducted in a fluid medium.

It is yet another object of this invention to provide a process wherein the disproportionation catalyst is introduced into the disproportionation reactor, recovered from the reactor and regenerated, and then recycled to the reactor while being maintained in the solid state.

Other aspects, objects and the several advantages of this invention will be apparent to one skilled in the art from the following specification and appended claims.

In accordance with this invention, I have discovered that the conversion of a metal oxide to the corresponding metal salt of an aromatic carboxylic acid can be conveniently conducted in a slurry system. More precisely, in accordance with this invention, the solid metal oxide is dispersed in an inert organic dispersant to form a slurry; the slurry is thereafter contacted in a reaction zone with an aromatic carboxylic acid at an elevated temperature for a time sufficient to convert the metal oxide to the corresponding metal salt of the aromatic carboxylic acid. This reaction produces a second slurry comprised of the solid metal salt of the aromatic carboxylic acid and the organic dispersant.

The resulting second slurry containing the solid metal salt of the aromatic carboxylic acid in an organic dispersant is highly useful in the production of aromatic polycarboxylates by disproportionation of alkali metal salts of aromatic carboxylic acids. In this use the solid metal salt is the disproportionation catalyst and the disproportionation reaction itself is conducted in a slurry system. Thus, the organic dispersant is not only the dispersant for the metal oxide (which is the spent catalyst) and the metal salt (which is the regenerated catalyst), but it is also the dispersant for the disproportionation reaction. Accordingly, the entire cycle, including the disproportionation reaction, the preliminary recovery of the aromatic polycarboxylate, the regeneration of the spent catalyst and the recycle of regenerated catalyst to the disproportionation reaction, is conducted in a fluid medium which is the organic dispersant.

Utilizing the slurry system provides improved handling, mixing and heat transfer properties. The disproportionation reaction effluent is not in a fused form but is, instead, carried as finely divided particles in the organic dispersant from which the desired product can be conveniently removed with the solid spent disproportionation catalyst remaining in the dispersant.

There is thus provided an improved disproportionation process for the conversion of an alkali metal salt of an aromatic carboxylic acid to an aromatic polycarboxylate containing at least one additional carboxyl group wherein a slurry comprised of an alkali metal salt of an aromatic carboxylic acid, a disproportionation catalyst and an inert high-boiling organic dispersant is subjected to heating at an elevated temperature in the presence of a gas atmosphere to thus form the desired polycarboxylate product. During the disproportionation reaction the disproportionation catalyst, which is a metal salt of an aromatic carboxylic acid, is converted to metal carbonates and oxides, primarily oxide. Therefore, the effluent from the disproportionation reaction is a slurry comprised of the desired aromatic polycarboxylate, the metal oxide, and the organic dispersant. The disproportionation reactor slurry is then introduced into a separation zone, as hereinafter described, wherein the aromatic polycarboxylate product is separated from the slurry to thereby recover a slurry comprised only of the metal oxide and organic dispersant. It is this slurry which is contacted with an aromatic carboxylic acid to regenerate the disproportionation catalyst.

The metal oxide referred to in this invention is an oxide of a metal selected from the group consisting of zinc, cadmium, mercury, lead and iron. Thus, the metal oxides converted to metal salts by the process of this invention are zinc oxide, cadmium oxide, mercury oxide, lead oxide and iron oxide, these oxides being formed during the disproportionation reaction. Salts of the above metals formed with aromatic carboxylic acids serve as catalysts for the disproportionation of alkali metal salts of aromatic carboxylic acids.

The particular aromatic carboxylic acids used in this invention for the conversion of the metal oxide to the corresponding metal salt are preferably in the molten state when they are placed in contact with the metal oxide-containing slurry. In addition, the quantity of aromatic carboxylic acid utilized to regenerate the catalyst is expressed in stoichiometric terms. Accordingly, the mole ratio of the aromatic carboxylic acid to the metal oxide in the reaction zone is in the range of 1.9 to 2.1, preferably 1.95 to 2.0 moles aromatic carboxylic acid per mole of metal oxide.

The aromatic mono- or polycarboxylic acids useful in this invention are those of the formula

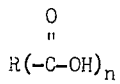

wherein R is an aromatic or alkyl aromatic group having 6 to 15 carbon atoms therein and n is the integer 1, 2 or 3. Such acids include, for example, benzoic acid, 2-naphthalene-carboxylic acid, 4-biphenylcarboxylic acid, 2,6-naphthalene-dicarboxylic acid, phthalic acid, isophthalic acid, terephthalic acid, 2-anthracenecarboxylic acid, 1,5-anthracenedicarboxylic acid, 1,5,19-anthracenetricarboxylic acid, 3-phenanthrenecarboxylic acid, 2,3,4-trimethylbenzenecarboxylic acid, 2,4,6-trimethylbenzene-1,3-dicarboxylic acid, 2-ethyl-4-hexyl-6-methylbenzene-1,3-dicarboxylic acid, 2,4-dibutylbenzene-1,3,5-tricarboxylic acid, and the like.

In all of the above-mentioned carboxylic acids the aromatic ring may carry alkyl radicals, in addition to the carboxyl groups, provided that these alkyl radical substituents do not bring about a decomposition of the molecule at temperatures equal to or lower than the reaction temperature.

It is clear, therefore, in view of the aromatic carboxylic acids useful to regenerate the metal oxide, that the resulting metal salts of the aromatic carboxylic acid, which are also useful as disproportionation catalysts, include, for example, the aromatic carboxylic acid salts of zinc, cadmium, mercury, lead, and iron. Examples of these include, but are not limited to, such compounds as cadmium benzoate, cadmium phthalate, cadmium isophthalate, cadmium terephthalate, zinc benzoate, zinc phthalate, zinc isophthalate, zinc terephthalate, and the like.

The regeneration of the metal oxide to the metal salt of the aromatic carboxylic acid in the presence of the organic dispersant upon contact with the molten aromatic carboxylic acid is conducted at a temperature in the range of 125° to 260° C., preferably 145° to 225° C. The time of contact between the spent metal catalyst is sufficient to produce a second slurry in the reaction regeneration zone comprised of the metal salt of the aromatic carboxylic acid and the organic dispersant. This time is generally in the range of 0.01 to 10, preferably 0.1 to 2 hours.

The organic dispersant useful herein is one which will not decompose under the various conditions of the process, which is inert to the catalyst and reactants, and which is relatively high boiling. Such organic dispersants include aromatic hydrocarbons selected from the group consisting of polyaromatic compounds having two or more aromatic rings, polynuclear aromatics and mixtures thereof. Examples of such organic dispersants include biphenyl, terphenyls, quaterphenyls, pentaphenyls and heavier polyphenyls; binaphthyls, naphthalene, anthracene, phenanthrene, pyrene, triphenylene, chrysene, perylene, pentacenyl and mixtures thereof. It is desirable that the organic dispersant remain in the liquid state throughout the process; thus the compound should have a melting point below about 150° C. Mixtures of two or more of the compounds can be utilized to reduce the melting point of the dispersant. It is also desirable that the dispersant have a relatively high boiling point, for example, above about 250° C., in order to aid in maintaining the reaction pressure at a low level.

The organic dispersant is present in the metal oxide slurry in the reaction zone in an amount in the range of from 10 to 99.9 percent by weight of the total weight of the slurry and preferably in an amount in the range of from 40 to 99.5 percent by weight of the total weight of the slurry.

In a preferred embodiment, the aromatic carboxylic acid is benzoic acid, the metal salt, i.e., the disproportionation catalyst, is zinc benzoate, the aromatic polycarboxylate, i.e., the disproportionation reaction product, is dipotassium terephthalate, the metal oxide is zinc oxide, and the organic dispersant is terphenyl.

After the metal catalyst is regenerated, the slurry thus produced containing the metal salt of the aromatic carboxylic acid is introduced into the disproportionation zone and contacted therein with an alkali metal salt of an aromatic carboxylic acid to thus produce a mixture comprised of the alkali metal salt of an aromatic carboxylic acid, the disproportionation catalyst, which is the regenerated compound, and the organic dispersant. This slurry is then subjected to heating in a gas atmosphere according to the well-known disproportionation process in order to effect the conversion of the alkali metal salt to the desired aromatic polycarboxylate. During this conversion the catalyst is changed from a metal salt to metal carbonates and oxides, primarily the oxide. During the later separation of the aromatic polycarboxylic acid from the slurry, as by water quenching, the metal carbonate is converted to metal oxide.

Preliminary to the regeneration of the spent metal catalyst, which is dispersed in the organic dispersant, the concentration of the organic dispersant in the slurry can be adjusted to the concentrations previously mentioned by a separation step such as settling, cycloning, filtering, centrifuging, and the like. Thus, the dispersion of metal oxide particles in dispersant obtained from the hereinafter-described water quench step can be passed to a cyclone which removes, for example, as much as 80 percent of the organic dispersant as overflow for direct recycle to the disproportionation reactor or to other processing steps. Bottoms from the cyclone contain a high concentration of metal oxide particles in dispersant and are passed to the catalyst regeneration step wherein the metal oxide is converted to the corresponding metal salt of an aromatic carboxylic acid. The bulk of the organic dispersant can thus be bypassed around the catalyst regeneration step.

As is known in the disproportionation reaction, the amount of catalyst used can vary within wide limits and can range from 0.1 to 100 grams of catalyst per mole of aromatic carboxylate employed, more preferably in the range of 1 to 50 grams per mole.

The disproportionation of the alkali metal carboxylate is effected substantially completely in the absence of oxygen, hydrogen or water. In general, temperatures in the range of about 350° to 500° C. are employed, and more preferably in the range of 400° to 480° C. The disproportionation process can be carried out in a gas atmosphere. Examples of such gases include nitrogen, methane, argon, neon, butane, ethane, helium and the like. In one embodiment there is utilized an atmosphere which contains additionally at least 50 mole percent carbon dioxide. However, the presence of carbon dioxide in the atmosphere in which the thermal conversion is carried out is not essential to the obtaining of the high conversion of initial reactant. In addition, carbon monoxide or a mixture of CO and $CO_2$ can be used in carrying out the process of the invention.

Pressures in the range of 0 to 5,000 psig or more can be employed in the disproportionation but it is advantageous and preferable that lower pressures in the range of 0 to 1,000 psig be employed.

Sufficient reaction time should be employed to effect the desired degree of conversion. Generally, disproportionation reaction times in the range of about 1 second to about 48 hours, preferably 5 seconds to two hours, are suitable.

In addition, the disproportionation reaction can be promoted by addition of alkali metal salts, preferably potassium salts of derivatives of cyanic acid or its polymers, to the reaction mixture. Suitable polymers or derivatives of cyanic acid are, for example, cyanuric acid, cyanamide and dicyandiamide. The derivatives of cyanic acid are preferably employed in the form of their potassium salts, provided they form salts with alkali metals. In many cases the use of potassium cyanate offers special advantages.

The aromatic polycarboxylates which are produced in the disproportionation reaction can be recovered from the reaction effluent slurry in a separation zone by adding water to the slurry followed by agitation and settling. The water, being substantially completely immiscible with the organic dispersant, separates as a separate liquid phase carrying with it in solution the water-soluble aromatic polycarboxylates. The organic dispersant phase, which contains the spent catalyst particles, that is, the metal oxide, is easily removed from the water phase by conventional phase separation techniques, such as by decantation. Any metal oxide particles in the water phase can be recovered by filtration or centrifuging, and the like, and added to those in the organic phase. The organic phase is then introduced into the regeneration reaction zone and wherein the metal oxide is converted to the corresponding metal salt of an aromatic carboxylic acid according to the process of this invention.

The following examples will enable persons skilled in the art to better understand and practice the invention. However, the examples are not intended to limit the scope of this invention.

EXAMPLE I

In a demonstration test of the solid-state conversion of zinc oxide to zinc benzoate while dispersed in terphenyl, a mixture of 0.162 gram of zinc oxide, 0.960 gram molten benzoic acid, and 12 grams terphenyl was stirred at 190° C. for 2 hours to complete the reaction. To the reaction effluent was added 6 grams of potassium benzoate and the resulting mixture passed to a stainless steel, stirred reactor to effect the disproportionation of potassium benzoate to dipotassium terephthalate and benzene. The reaction was continued for 1½ hours at 440° C. under a $CO_2$ pressure of 200 psig. At the completion of the reaction, the effluent was dissolved in water and the dipotassium terephthalate recovered in an amount equal to 66 weight percent of the potassium benzoate charged to the reactor. It was thus demonstrated that zinc oxide can be converted to an active zinc benzoate disproportionation catalyst while dispersed in terphenyl.

EXAMPLE II

In a second demonstration of the regeneration and continued recycle of disproportionation catalyst a mixture of 5.0 grams potassium benzoate and 0.50 gram of zinc benzoate catalyst was dispersed in 10.0 grams of Santowax R (commercial grade of terphenyl obtained from Monsanto Chemical). The resulting slurry was charged to a 30 ml stainless steel bomb, the bomb pressured to 200 psig with carbon dioxide, and the bomb and contents then heated to 440° C. for 1.5 hours to effect disproportionation of the potassium benzoate to dipotassium terephthalate. At the end of the reaction period, the contents of the bomb were cooled from 440° C. to room temperature and then mixed with 50 ml of water in a pressure bottle. The mixture was then heated and stirred at 140° to 160° C. for half an hour and then filtered. The filtrate consisted of an aqueous solution of dipotassium terephthalate which was evaporated to dryness and the yield of product measured.

To the slurry residue from the filtration step, consisting of solid zinc oxide particles in Santowax, was added 0.4 gram of molten benzoic acid and the slurry heated to 155° C. and stirred at this temperature for 1 hour. The slurry was further heated in an oven at 140° C. for 2 hours for removal of final traces of water. To the slurry, now consisting of zinc benzoate dispersed in Santowax, was added 5.0 grams of potassium benzoate and the mixture charged to the 30 ml stainless steel disproportionation reactor as before.

The above cycle was repeated 5 times; the following yields of dipotassium terephthalate, expressed in terms of weight percent of potassium benzoate charged per cycle and also expressed in terms of percent of maximum theoretical yield, are as follows:

|  | Potassium Benzoate Basis | Maximum Theoretical Basis |
| --- | --- | --- |
| 1st Cycle | 69% | 91% |
| 2nd Cycle | 66% | 87% |
| 3rd Cycle | 63% | 83% |
| 4th Cycle | 65% | 86% |
| 5th Cycle | 68% | 90% |

It was thus demonstrated that the activity of zinc benzoate as a disproportionation catalyst is maintained through repeated cycles, said catalyst being recycled and regenerated as a dispersed solid in a fluid medium.

Reasonable variations and modifications are possible within the scope of the foregoing disclosure without departing from the spirit and scope thereof.

I claim:

1. A disproportionation process for the conversion of an alkali metal salt of an aromatic carboxylic acid to an aromatic polycarboxylate containing at least one additional carboxyl group wherein a slurry comprised of an alkali metal salt of an aromatic carboxylic acid, a disproportionation catalyst comprised of a metal salt of an aromatic carboxylic acid, said metal being selected from the group consisting of zinc, cadmium, mercury, lead and iron, and an inert high-boiling organic dispersant selected from the group consisting of polyaromatic compounds having two or more aromatic rings, polynuclear aromatics and mixtures thereof is subjected to heating in a disproportionation zone at an elevated temperature so as to form said aromatic polycarboxylate, wherein the resulting reaction mixture comprising said aromatic polycarboxylate, spent catalyst and said dispersant is contacted with water and wherein there is recovered a mixture comprised of said spent catalyst comprised of an oxide of said metal and dispersant is thereafter contacted with an aromatic dicarboxylic acid so as to form a slurry comprised of a disproportionation catalyst and dispersant, and thereafter recycling said slurry of disproportionation catalyst and dispersant to said disproportionation zone wherein in said disproportionation zone said metal salt and said dispersant constituents of said slurry are catalyst and dispersant, respectively, for said disproportionation.

2. The process of claim 1 wherein said disproportionation catalyst is zinc benzoate, said alkali metal salt of an aromatic carboxylic acid is potassium benzoate, said dispersant is terphenyl and said spent catalyst is zinc oxide.

3. The process of claim 1 wherein said aromatic carboxylic acid is represented by the general formula

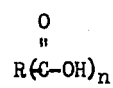

wherein R is selected from the aromatic and alkyl aromatic groups having 6 to 15 carbon atoms and n is an integer 1, 2 or 3.

4. The process according to claim 1 wherein up to 80 percent of said dispersant is removed from said slurry of metal oxide and dispersant prior to the contacting of said slurry with said aromatic carboxylic acid.

5. The process of claim 1 wherein said slurry of disproportionation catalyst and dispersant is dried prior to recycle thereof to said disproportionation zone.

* * * * *

UNITED STATES PATENT OFFICE
CERTIFICATE OF CORRECTION

PATENT NO. : 3,875,218
DATED : April 1, 1975
INVENTOR(S) : Yu-Lin Wu

It is certified that error appears in the above-identified patent and that said Letters Patent are hereby corrected as shown below:

Column 7, between lines 24 and 25, insert the following:

---dispersant and wherein said mixture of spent catalyst and---.

Signed and sealed this 1st day of July 1975.

(SEAL)
Attest:

RUTH C. MASON
Attesting Officer

C. MARSHALL DANN
Commissioner of Patents
and Trademarks